United States Patent Office 3,070,539
Patented Dec. 25, 1962

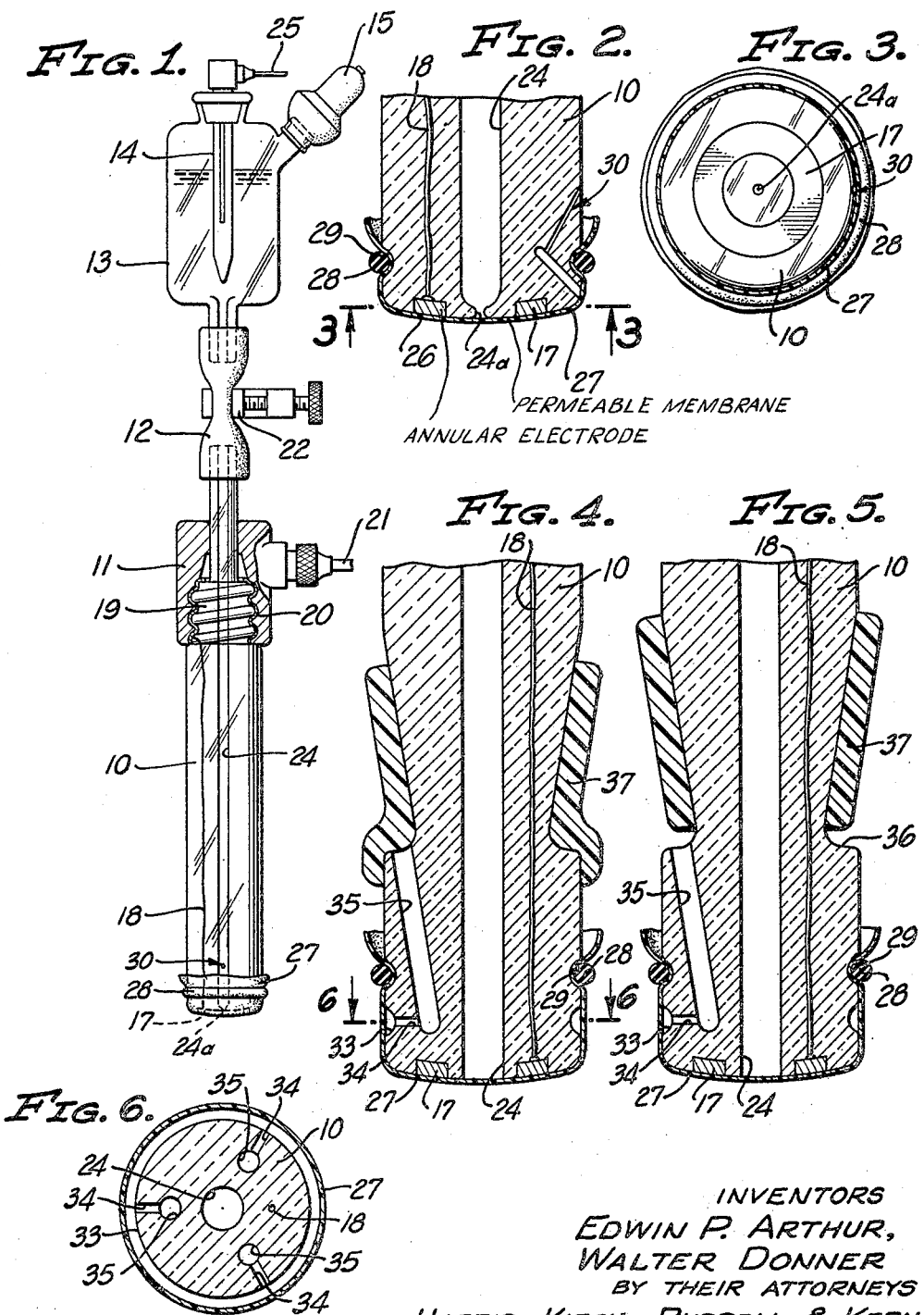

3,070,539
IONIC TRANSDUCER
Edwin P. Arthur, Fullerton, and Walter Donner, Brea, Calif., assignors to Beckman Instruments, Inc., a corporation of California
Filed Jan. 25, 1960, Ser. No. 4,529
13 Claims. (Cl. 204—195)

This invention relates to electrode assemblies for use in analysis of fluids and, in particular, to electrode assemblies utilizing selectively permeable membranes for isolating the electrode from the sample under test.

Electrode structures of this type are often designed with a very thin liquid film space between the membrane and the active surface of the electrode with the electrolyte being positioned in this space. In a typical instrument, the membrane will be pressed against the face of the electrode with the inherent unevenness of the elements providing the liquid film space, or a very thin, porous spacer may be positioned between the electrode and the membrane for the same purpose. This very thin film space is desirable for highly sensitive instruments; however, such instruments exhibit slow recovery from sample equilibrium and suffer from drift and nonreproducibility of readings. It is an object of the present invention to provide an electrode assembly utilizing a selectively permeable membrane for separating the electrolyte from the sample which exhibits a rapid recovery from changes in sample equilibrium while maintaining the desired high sensitivity of this type of instrument.

It is an object of the invention to provide an electrode assembly having an electrode and a thin film of electrolyte positioned behind a membrane and means for maintaining fresh electrolyte in the sensitive area. Another object is to provide an electrode assembly in which the electrolyte in the sensitive area may be replaced by fresh electrolyte at will. A further object is to provide such an electrode assembly in which the thin film space at the end of the instrument may be flushed with a large supply of electrolyte when desired.

It is an object of the invention to provide an electrode assembly having a body member with an end and an electrolyte flow passage terminating at the end, an electrode carried in the body positioned about the passage and having a face exposed at the end, a selectively permeable membrane positioned over the end defining a liquid film space between a surface of the membrane and the face of the electrode with the other surface of the membrane being exposable to a sample, a source of electrolyte under controllable pressure for flow at will from the passage of the body member through the film space between the electrode and the membrane, and means for electrically connecting the electrode and the electrolyte to an indicating device.

It is another object of the invention to provide a new and improved electrode construction that can be used with the various known analysis reactions involving selectively permeable membranes and isolated electrolytes such as polarographic determinations of oxygen content and reduction-oxidation equilibrium measurements for carbon dioxide.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a side view of a preferred embodiment of the present invention;

FIG. 2 is an enlarged sectional view of the lower end of the structure of FIG. 1;

FIG. 3 is a sectional view taken along the line 3—3 of FIG. 2;

FIG. 4 is a view similar to that of FIG. 2 of an alternative embodiment of the invention;

FIG. 5 is a view of the instrument of FIG. 4 in the rapid flush condition; and

FIG. 6 is a sectional view taken along the line 6—6 of FIG. 4.

The electrode structure of FIG. 1 includes a body member 10, a socket 11, a coupling 12, a reservoir 13 and a half-cell 14. A source of pressure, such as a rubber bulb 15, may be mounted on the reservoir 13. The body member 10 may be of glass, plastic or other suitable material and is preferably molded to the desired shape. An electrode 17 in the form of a metal ring, preferably of platinum or other noble metal, is carried at the lower end of the body member and means is provided for an electrical connection to the electrode. Such means may include a conductor 18 molded in the body member and leading from the electrode to a threaded section 19 adjacent the upper end of the body member. The threaded section is intended to engage a metal shell 20 carried in the socket 11 and having mating threads formed therein, the shell being electrically connected to a conductor 21. The conductor 18 in the body member preferably terminates in a metal plate or the like for direct contact with the shell when the body member is threaded into the socket.

The coupling member 12 which joins the body member and the reservoir may be a length of flexible tubing, permitting the electrode body member to be moved at will while the reservoir may be mounted in a fixed location. A clamp 22 may be carried on the coupling member for pressure regulation and flow control. The reservoir is filled with an electrolyte which flows downward through the coupling member 12 and through a passage 24 in the body member when pressure is applied. The passage 24 may be terminated with a small orifice 24a as shown in FIG. 2. Of course, other means for supplying electrolyte under pressure may be substituted. Also, in a compact design, the reservoir may be formed directly at the upper end of the body member. The half-cell 14 may be of conventional design, such as a calomel half-cell, and provides an electrical connection between the electrolyte and a conductor 25.

The electrode 17 is positioned about the passage 24 in the body member and has a face 26 substantially flush with the lower end of the body member. A membrane 27 is positioned over the end of the body member and may be clamped in place by a resilient ring 28 fitting into an annular groove 29.

While the membrane 27 is stretched over the end of the body member and is clamped in place, there exists between the body member and membrane a space for a very thin film of electrolyte. In some applications of this construction, the inherent roughness of the components will provide the necessary film space. In other installations, a thin layer of porous materials, such as filter paper, may be placed between the electrode 17 and the membrane 27 to provide a reservoir of very, very small volume.

A small passage 30 may be provided in the body member 10 for bypassing the membrane clamping structure. Such a passage may be in the nature of a weep hole 0.020 to 0.030 inch diameter and serves to prevent pressure build-up at the membrane.

When pressure is applied at the reservoir, the electrolyte flows downward through the passage 24, radially outward through the film space between the membrane and the end of the body member and the face of the electrode, and upward along the outer surface of the body member through the weep hole or past the clamping. By controlling the pressure of the reservoir, a controlled flow of fresh electrolyte to the active zone between the membrane and the electrode is achieved. This structure provides the desirable very thin film space in the active zone and hence the high sensitivity while at the same time providing a supply of fresh electrolyte resulting in more rapid and more precise measurements.

A typical use for this electrode structure is the determination of the carbon dioxide content of a liquid or gaseous sample. The membrane is selected to be highly permeable to carbon dioxide and relatively impermeable to other constituents found in the sample that may cause reaction with the particular electrolyte used. A natural rubber membrane is suitable for most applications. Other membrane materials which may be used are polyethylene, vinyl chloride, and silicone rubber. The electrode is of platinum, the electrolyte is a solution of quinhydrone and carbonate and the leads 21, 25 are connected to a suitable potential measuring device such as a vacuum tube voltmeter. The potential indicated at the meter is a function of the equilibrium of quinone and hydroquinone in the solution, which in turn is a function of the quantity of carbon dioxide entering the solution in the zone between the electrode and the membrane. As another example of use of the electrode structure, it may be used in polarographic determinations of oxygen content as described in the U.S. patent to Clark, No. 2,913,386.

After each measurement is complete, the bulb 15 is squeezed to force a small quantity of electrolyte down the passage 24 and into the film space. In an alternative mode of operation, a source of continuous pressure, such as the atmosphere, may be coupled to the reservoir 13 and flow to the film space can be controlled by the clamp 22. In some applications of the instrument, it may be desirable to provide a slow continuous flow and the clamp 22 may then be used as a throttling device.

An alternative form of the electrode structure is shown in FIGS. 4, 5 and 6, wherein elements identical to those of the earlier embodiment are identified by the same reference numerals. An annular groove 33 is provided in the outer surface of the body member 10 between the end of the member and the groove 29. This groove 33 serves as a manifold for communication with three radial passages 34 and connecting oblique passages 35. The upper end of each of the passages 35 terminates at an outlet opening in a shoulder 36 formed in the body member. Means is provided for closing the outlets during normal operation of the instrument, a suitable means being a rubber sleeve 37 slidably positioned on the body member. The sleeve 37 is shown in the outlet closed position in FIG. 4 and in the outlet open position in FIG. 5.

The flow paths provided by the groove 33 and the passages 34, 35 bypass the seal ring 28 and permit flushing of the active zone of the electrode structure at a high rate of flow of electrolyte when the sleeve 37 is moved to the outlet open position, and pressure is applied to the electrolyte. When measurements are being made, the sleeve is maintained in the outlet closed condition of FIG. 4. After a measurement is completed, all traces of a sample may be rapidly flushed out of the instrument by moving the sleeve to the open condition and applying pressure to the electrolyte, permitting a quantity of electrolyte to flow through the film space at a relatively rapid rate.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In an ionic transducer for reaction with a sample, the combination of: a body having an axial fluid flow passage terminating in an opening at an end of said body; an electrode carried in said end and disposed about said passage with a face exposed at said end; a selectively permeable membrane; means for clamping said membrane over said end with one surface exposed for contact with the sample and with the other surface and said end defining an electrolyte film space; means defining a source of electrolyte coupled to said passage for electrolyte flow through said passage and radially outward through said film space over said end between said electrode face and said membrane; and means for electrically connecting said electrode and said electrolyte to an indicating device.

2. In an ionic transducer fro reaction with a sample, the combination of: a body having an axial inlet passage terminating at an end of said body; an electrode carried in said end and disposed about said inlet passage; a selectively permeable membrane; means for clamping said membrane over said end with one surface exposed for contact with the sample and with the other surface and said end defining an electrolyte film space, said body having a bypass passage providing fluid flow through said body past said clamping means; a source of electrolyte; means for applying pressure to said source for electrolyte flow through said passage and through said film space over said end between said electrode and said membrane and through said bypass passage; and means for electrically connecting said electrode and said electrolyte to an indicating device.

3. In an ionic transducer for reaction with a sample, the combinaion of: an elongate body having an axial fluid flow passage terminating at an end of said body; an electrode carried in said end and disposed about said passage; a selectively permeable membrane; means for clamping said membrane over said end with one surface exposed for contact with the sample and with the other surface and said end defining an electrolyte film space; a reservoir of electrolyte positioned above and connected with said passage; means for applying pressure to said reservoir for electrolyte flow at will through said passage and through said film space over said end between said electrode and said membrane; a half-cell positioned in said reservoir; and means for electrically connecting said electrode and said half-cell to an indicating device.

4. In an ionic transducer for reaction with a sample, the combination of: an elongate body of electrically nonconducting material having an axial fluid flow passage terminating at an end of said body; an annular ring of electrically conducting metal carried in said end substantially flush with the surface thereof; a selectively permeable membrane; means for clamping said membrane over said end defining a liquid film space therebetween; a source of electrolyte coupled to said flow passage; means for applying pressure to the electrolyte in said source for electrolyte flow through said passage and said film space; and means for electrically connecting said ring and said electrolyte to an indicating device.

5. In an electrode assembly, the combination of: a cylindrical body having an axial inlet fluid flow passage terminating in an opening at an end of said body; an annular electrode carried in said end with a face substantially flush with the surface thereof and positioned about said inlet passage; an annular groove in the external surface of said body adjacent said end; a bypass passage of small diameter in said body for flow past said groove; a selectively permeable membrane positioned over said end and extending above said groove; a resilient ring positioned over said membrane at said groove and clamping said membrane to said body defining an electrolyte film space between said membrane and body; means defining a source of electrolyte coupled to said inlet passage for electrolyte flow through said inlet passage and through said film space over said end between said electrode face and said membrane and out said bypass passage; and means for electrically connecting said electrode and said electrolyte to an indicating device.

6. In an electrode assembly, the combination of: a cylindrical body having an axial fluid flow passage terminating in an opening at one end of said body; an annular electrode carried in said end with a face substantially flush with the surface thereof and positioned about said passage for fluid flow therethrough; first and second annular grooves in the external surface of said body adjacent said end, with said first groove positioned between said second groove and said end; a chamber in said body providing fluid communication between said first groove and the exterior of said body above said second groove; means for closing said chamber; a selectively permeable membrane positioned over said end and extending beyond said second groove; a resilient ring positioned about said membrane at said second groove and clamping said membrane against said end defining an electrolyte film space between said membrane and end; means defining a source of electrolyte coupled to said passage for electrolyte flow through said passage, through said film space radially outward over said end and up past said grooves; means for controlling said electrolyte flow; and means for electrically connecting said electrode and said electrolyte to an indicating device.

7. In an ionic transducer for reaction with a sample, the combination of: a body having a first axial passage terminating in an opening at an end of said body; an electrode carried in said end and disposed about said first passage with a face exposed at said end; a second passage in said body providing communication between an inlet opening in the exterior of said body adjacent said end and an outlet opening in the exterior of said body above said inlet opening; means for closing said second passage; a selectively permeable membrane positioned over said end, with one surface exposed for contact with the sample and with the other surface and said end defining an electrolyte film space; means for clamping said membrane to said body between said inlet opening and said outlet opening; means defining a source of electrolyte coupled to said first passage under controlled pressure for electrolyte flow through said passage and through said film space over said end between said electrode face and said membrane; and means for electrically connecting said electrode and said electrolyte to an indicating device.

8. In an electrode assembly, the combination of: a body member having an end and an electrolyte flow passage terminating in an opening at said end; an electrode carried in said body member and positioned about said passage for electrolyte flow therethrough and having a face exposed at said end; a selectively permeable membrane positioned over said end defining a liquid film space between one surface of said membrane and said face of said electrode, the other surface of said membrane being exposable to a sample; means for mounting said membrane on said body; means defining a source of electrolyte coupled to said passage under controlled pressure for electrolyte flow in said passage and through said film space; and means for electrically connecting said electrode and said electrolyte to an indicating device.

9. A device as defined in claim 8 having a thin, porous material positioned in said film space separating said electrode and membrane.

10. In an electrode assembly for exposure to a constituent to be measured, the combination of:
a body having an axial inlet fluid flow passage terminating in an opening at an end of said body;
an electrode carried in said end and disposed about said passage for fluid flow therethrough;
a membrane selectively permeable to said constituent;
means for supporting said membrane with one surface thereof closely adjacent to said end defining a liquid film space between said end and said one surface, with the other surface of said membrane being exposable to an environment containing said constituent;
means defining an exit fluid flow passage separate from said inlet flow passage;
means defining a source of electrolyte coupled to said inlet passage for electrolyte flow through said inlet passage, said liquid film space, and said exit passage;
and means for electrically connecting said electrode and said electrolyte to an indicating device.

11. A transducer as defined in claim 2 including a layer of thin, porous material positioned in said film space between the end of said body and said membrane.

12. A transducer as defined in claim 2 in which said means for applying pressure to said electrolyte source includes a closed chamber and a manually compressible bulb attached thereto.

13. In an ionic transducer for reaction with a sample, the combination of:
an elongate body having an axial fluid flow passage terminating in an opening at an end of said body;
an electrode carried in said end and disposed about said passage;
a selectively permeable membrane;
means for clamping said membrane over said end with one surface exposed for contact with the sample, and with the other surface and said end defining an electrolyte film space;
a reservoir of electrolyte positionable above and connected with said passage for applying pressure to the electrolyte in said passage to produce electrolyte flow through said passage and radially outward through said film space over said end; and
means for electrically connecting said electrode and said electrolyte to an indicating device.

References Cited in the file of this patent

UNITED STATES PATENTS

| | | |
|---|---|---|
| 2,651,612 | Haller | Sept. 8, 1953 |
| 2,722,658 | Richards | Nov. 1, 1955 |
| 2,755,243 | Beckman et al. | July 17, 1956 |
| 2,805,191 | Hersch | Sept. 3, 1957 |
| 2,913,386 | Clark | Nov. 17, 1959 |
| 2,943,028 | Thayer et al. | June 28, 1960 |
| 3,000,805 | Carritt et al. | Sept. 19, 1961 |